(12) United States Patent
Yu

(10) Patent No.: US 11,789,514 B2
(45) Date of Patent: Oct. 17, 2023

(54) STANDBY CONTROL METHOD AND SYSTEM, TERMINAL, AND RELAY DEVICE

(71) Applicant: HUAWEI TECHNOLOGIES CO., LTD., Guangdong (CN)

(72) Inventor: Kexiong Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 17/105,078

(22) Filed: Nov. 25, 2020

(65) Prior Publication Data

US 2021/0081021 A1 Mar. 18, 2021

Related U.S. Application Data

(63) Continuation of application No. PCT/CN2019/076930, filed on Mar. 5, 2019.

(30) Foreign Application Priority Data

May 31, 2018 (CN) .......................... 201810553415.X

(51) Int. Cl.
*G06F 1/3209* (2019.01)
*H04L 43/10* (2022.01)
*H04L 67/56* (2022.01)

(52) U.S. Cl.
CPC ............ *G06F 1/3209* (2013.01); *H04L 43/10* (2013.01); *H04L 67/56* (2022.05)

(58) Field of Classification Search
CPC ........ G06F 1/3209; H04L 67/56; H04L 43/10
See application file for complete search history.

(56) References Cited

U.S. PATENT DOCUMENTS

| 7,768,939 | B1 * | 8/2010 | Trevedi | .................. | H04L 43/10 |
| | | | | | 709/224 |
| 10,003,543 | B2 * | 6/2018 | Ajitomi | .................. | H04L 47/28 |

(Continued)

FOREIGN PATENT DOCUMENTS

| CN | 102939782 A | 2/2013 |
| CN | 103283300 A | 9/2013 |

(Continued)

OTHER PUBLICATIONS

Extended European Search Report in European Application No. 19810735.1, dated Mar. 26, 2021, 11 pages.

(Continued)

*Primary Examiner* — Aurel Prifti
(74) *Attorney, Agent, or Firm* — Fish & Richardson P.C.

(57) ABSTRACT

A standby control method includes sending first notification information to a relay device through a first communication link by a terminal before entering a standby mode. The relay device serves as a proxy for the terminal based on the first notification information, and the relay device sends a first keep-alive packet to a cloud server to inform the cloud server that the terminal is online. The terminal then disables the first communication link and a main CPU. The relay device sends a second keep-alive packet to the terminal through a second communication link, and the terminal sends acknowledgement information of the second keep-alive packet to the relay device through the second communication link to inform the relay device that the terminal is online, where a communication rate of the second communication link is lower than a communication rate of the first communication link.

20 Claims, 7 Drawing Sheets

(56) References Cited

U.S. PATENT DOCUMENTS

| | | | |
|---|---|---|---|
| 11,089,114 B1* | 8/2021 | Saalfeld | H04L 43/103 |
| 2009/0219844 A1* | 9/2009 | Soliman | H04W 88/04 |
| | | | 370/311 |
| 2009/0221261 A1* | 9/2009 | Soliman | H04W 88/04 |
| | | | 455/343.2 |
| 2010/0138538 A1* | 6/2010 | Zheng | H04L 43/10 |
| | | | 709/228 |
| 2010/0211676 A1* | 8/2010 | Takada | H04L 12/437 |
| | | | 709/224 |
| 2012/0157170 A1 | 6/2012 | Backholm et al. | |
| 2012/0173901 A1* | 7/2012 | Soliman | H04W 88/182 |
| | | | 713/320 |
| 2013/0007484 A1* | 1/2013 | Gobriel | G06F 1/3287 |
| | | | 713/320 |
| 2020/0174466 A1* | 6/2020 | Zhang | H04L 43/0811 |

FOREIGN PATENT DOCUMENTS

| | | | | |
|---|---|---|---|---|
| CN | 105072029 A | 11/2015 | | |
| CN | 105637919 A | 6/2016 | | |
| CN | 107645556 A | 1/2018 | | |
| WO | 2012018556 A2 | 2/2012 | | |
| WO | WO-2012094131 A1 * | 7/2012 | | H04W 52/02 |
| WO | 2012174006 A1 | 12/2012 | | |
| WO | WO-2012174006 A1 * | 12/2012 | | H04L 67/145 |
| WO | WO-2019127103 A1 * | 7/2019 | | H04W 28/08 |

OTHER PUBLICATIONS

Office Action issued in Chinese Application No. 201810553415.X dated May 11, 2020, 46 pages (with English translation).
International Search Report and Written Opinion issued in International Application No. PCT/CN2019/076930 dated Mar. 13, 2019, 15 pages (with English translation).

* cited by examiner

STANDBY CONTROL METHOD AND SYSTEM, TERMINAL, AND RELAY DEVICE

CROSS-REFERENCE TO RELATED APPLICATIONS

This application is a continuation of International Application No. PCT/CN2019/076930, filed on Mar. 5, 2019, which claims priority to Chinese Patent Application No. 201810553415.X, filed on May 31, 2018. The disclosures of the aforementioned applications are hereby incorporated by reference in their entireties.

TECHNICAL FIELD

This application relates to the communications field, and in particular, to a standby control method and system, a terminal, and a relay device.

BACKGROUND

In recent years, an Internet of things technology has developed rapidly, and has a promising prospect in such industries as intelligent manufacturing, smart home, the Internet of vehicles, logistics, transportation, and meter reading. Many Internet of things terminals are devices with built-in batteries. A relatively long working time needs to be maintained. In addition, to meet a service requirement, the terminal needs to quickly communicate with a cloud network in real time. This provides a relatively high technical requirement for the Internet of thing terminal to meet low power consumption and quick networking.

The Internet of things terminal usually includes a main control module and a communications module. In the prior art, when the Internet of things terminal works normally, the main control module performs data processing, and the communications module obtains data from a router through a high-speed communication link and sends the data to the main control module, or sends data obtained through processing by the main control module to a router through a high-speed communication link.

When the Internet of things terminal is in a standby mode, the main control module is powered off. However, to keep the Internet of things terminal capable of being quickly networked and being remotely woken up, the communications module periodically transmits a keep-alive packet to the router through the high-speed communication link, to keep a heartbeat connection.

However, power consumption of transmitting the keep-alive packet through the high-speed communication link by the communications module is relatively high. Therefore, power consumption of the Internet of things terminal in the standby mode is relatively high.

SUMMARY

This application provides a standby control method, to reduce power consumption of a terminal in a standby mode.

A first aspect of the embodiments of this application provides a standby control system. The system includes a terminal and a relay device. The terminal is configured to: before entering a standby mode, send first notification information to the relay device through a first communication link. The relay device is configured to serve, based on the first notification information, as a proxy for the terminal to send a first keep-alive packet to a cloud server, so that the cloud server confirms that the terminal is online. The terminal is further configured to disable the first communication link and a main control central processing unit CPU. The relay device is further configured to send a second keep-alive packet to the terminal through a second communication link. The terminal is further configured to send acknowledgement information of the second keep-alive packet to the relay device through the second communication link, so that the relay device confirms that the terminal is online. A communication rate of the second communication link is lower than a communication rate of the first communication link.

According to the standby control system provided in the embodiments of this application, the terminal keeps a connection to the cloud by using the relay device, and business service data is transmitted between the terminal and the relay device through the first communication link. When the terminal enters the standby mode, the terminal disables the first communication link, and a second communications module of the terminal performs a heartbeat keep-alive operation with a second communications module of the relay device by using the second communication link. The communication rate of the second communication link is lower than the communication rate of the first communication link. In comparison with a heartbeat keep-alive operation performed by using the first communication link when the terminal is in the standby mode, in the embodiments of this application, power consumption of the terminal in the standby mode is reduced.

Based on the first aspect of the embodiments of this application, in a first implementation of the first aspect of the embodiments of this application, the terminal is further configured to receive, through the second communication link, a wakeup packet sent by the relay device; and the terminal is further configured to enable the main control CPU and the first communication link based on the wakeup packet.

According to the standby control system provided in the embodiments of this application, when the terminal is in the standby mode, the relay device sends the wakeup packet to the terminal through the second communication link, to wake up the terminal, so that the terminal restores a normal service mode from the standby mode. Therefore, a specific manner of waking up the terminal is provided, so that the solution is more feasible.

Based on the first aspect or the first implementation of the first aspect of the embodiments of this application, in a second implementation of the first aspect of the embodiments of this application, the disabling the first communication link includes disabling a radio frequency (RF) module used for high-speed data transmission.

According to the standby control system provided in the embodiments of this application, disabling the first communication link may be disabling the RF module used for high-speed data transmission, and enabling the first communication link may also be enabling the RF module used for high-speed data transmission. Therefore, a method for enabling or disabling the first communication link is provided, so that the solution is more feasible.

Based on the first implementation of the first aspect of the embodiments of this application or the second implementation of the first aspect of the embodiments of this application, in a third implementation of the first aspect of the embodiments of this application, the wakeup packet includes a channel parameter of the first communication link; and the terminal is specifically configured to enable the first communication link based on the channel parameter, to perform service communication with the relay device through the first communication link.

According to the standby control system provided in the embodiments of this application, when the terminal is woken up, the terminal may resume service communication by using the channel parameter of the first communication link that is obtained in the wakeup packet, thereby increasing a networking speed when the terminal is woken up.

Based on any one of the first implementation of the first aspect of the embodiments of this application to the third implementation of the first aspect of the embodiments of this application, in a fourth implementation of the first aspect of the embodiments of this application, before the terminal disables the first communication link, the terminal is further configured to send second notification information to the relay device through the first communication link, to notify the relay device that the RF module is to be disabled; and the relay device is further configured to: after receiving the second notification information, set the terminal to be in an online state on the first communication link.

According to the standby control system provided in the embodiments of this application, before the terminal enters the standby mode, the terminal may send the second notification information to the relay device to notify the relay device that the terminal is to enter the standby mode, so that the relay device sets a connection status of the terminal on the first communication link to an always-online state through parameter setting, and even if a preset time limit is exceeded, does not determine that the terminal is offline.

Based on any one of the first aspect of the embodiments of this application and the first implementation of the first aspect of the embodiments of this application to the fourth implementation of the first aspect of the embodiments of this application, in a fifth implementation of the first aspect of the embodiments of this application, when the relay device has not received the acknowledgement information of the second keep-alive packet from the terminal within a preset time limit, the relay device is further configured to stop sending the first keep-alive packet to the cloud server, so that the terminal is disconnected from the cloud server.

According to the standby control system provided in the embodiments of this application, after the terminal enters the standby mode, when the relay device has not received the acknowledgement information of the second keep-alive packet from the terminal within the preset time limit, the relay device determines that the terminal is offline, and stops performing a cloud keep-alive operation on the terminal, in other words, sending the first keep-alive packet to the cloud server, so that the relay device is prevented from always performing a cloud service as a proxy after the terminal is offline.

Based on any one of the first aspect of the embodiments of this application and the first implementation of the first aspect of the embodiments of this application to the fifth implementation of the first aspect of the embodiments of this application, in a sixth implementation of the first aspect of the embodiments of this application, a communication resource occupied by the acknowledgement information of the second keep-alive packet is smaller than a communication resource occupied by the second keep-alive packet.

According to the standby control system provided in the embodiments of this application, after entering the standby mode, the terminal keeps a heartbeat connection to the relay device by using the second communication link. The relay device sends the second keep-alive packet to the terminal. The terminal receives the second keep-alive packet and returns the acknowledgement information of the second keep-alive packet. Because the communication resource occupied by the acknowledgement information of the second keep-alive packet is smaller than the communication resource occupied by the second keep-alive packet, power consumption of the terminal in the standby mode can be further reduced.

Based on any one of the first aspect of the embodiments of this application and the first implementation of the first aspect of the embodiments of this application to the sixth implementation of the first aspect of the embodiments of this application, in a seventh implementation of the first aspect of the embodiments of this application, before the terminal disables the first communication link, the terminal is further configured to negotiate with the relay device about a heartbeat period by using the first communication link; and the relay device is specifically configured to send the second keep-alive packet to the terminal through the second communication link based on the heartbeat period.

According to the standby control system provided in the embodiments of this application, before the terminal enters the standby mode, the terminal may further negotiate with the relay device about the heartbeat period by using the first communication link. Therefore, a more specific implementation of sending the second keep-alive packet is provided, so that the solution is more feasible. Because the second keep-alive packet is periodically sent, communication resources can be further reduced, and power consumption can be reduced.

Based on any one of the first aspect of the embodiments of this application, the first implementation of the first aspect of the embodiments of this application, and the second implementation of the first aspect of the embodiments of this application, in an eighth implementation of the first aspect of the embodiments of this application, after a main control module of the terminal instructs the second communications module of the relay device to serve as a proxy to perform a keep-alive operation on the terminal in the standby mode, the main control module of the terminal negotiates with the second communications module of the relay device about a heartbeat period and a wakeup random number. The heartbeat period is a period of sending a keep-alive packet to the second communications module of the terminal by the second communications module of the relay device, and the wakeup random number is a security verification random number used when the terminal is woken up.

According to the standby control system provided in the embodiments of this application, when being in the standby mode, the terminal may negotiate with the relay device about the heartbeat period and the wakeup random number, so that the solution is more feasible.

Based on any one of the first aspect of the embodiments of this application, the first implementation of the first aspect of the embodiments of this application, and the second implementation of the first aspect of the embodiments of this application, in a ninth implementation of the first aspect of the embodiments of this application, the wakeup packet carries at least one of a wakeup feature code and a wakeup random number, and the wakeup feature code is a preset identifier used to identify the wakeup packet.

According to the standby control system provided in the embodiments of this application, when being woken up, the terminal may obtain the at least one of the wakeup feature code and the wakeup random number. The wakeup random number may be used for security verification, so that a wakeup process can be more secure, and the wakeup feature code may be used to identify the wakeup packet, so that the solution is more feasible and secure.

A second aspect of the embodiments of this application provides a standby control method, including: after a standby instruction is received, sending first notification information to a relay device through a first communication link, where the first notification information is used to instruct the relay device to serve as a proxy for a terminal to send a first keep-alive packet to a cloud server, so that the cloud server confirms that the terminal is online; disabling the first communication link and a main control central processing unit (CPU); and receiving a second keep-alive packet sent by the relay device through a second communication link, and returning acknowledgement information of the second keep-alive packet, so that the relay device confirms that the terminal is online, where a communication rate of the second communication link is lower than a communication rate of the first communication link.

According to the standby control method provided in the embodiments of this application, the terminal is connected to the relay device through the first communication link. When the terminal enters a standby mode, the terminal disables the first communication link, and a second communications module of the terminal performs a heartbeat keep-alive operation with the relay device by using the second communication link. The communication rate of the second communication link is lower than the communication rate of the first communication link. In comparison with a heartbeat keep-alive operation performed by using the first communication link when the terminal is in the standby mode, in the embodiments of this application, power consumption of the terminal in the standby mode is reduced.

Based on the second aspect of the embodiments of this application, in a first implementation of the second aspect of the embodiments of this application, after the disabling a main control central processing unit CPU, the method further includes: receiving a wakeup packet sent by the relay device through the second communication link; instructing, based on the wakeup packet, the main control CPU to be powered on; and enabling the first communication link based on the wakeup packet.

According to the standby control method provided in the embodiments of this application, when being in the standby mode, the terminal receives, through the second communication link, the wakeup packet sent by the relay device, and is woken up based on the wakeup packet, to restore a normal service mode from the standby mode. Therefore, a specific manner of waking up the terminal is provided, so that the solution is more feasible.

Based on the second aspect of the embodiments of this application or the first implementation of the second aspect of the embodiments of this application, in a second implementation of the second aspect of the embodiments of this application, the disabling the first communication link includes disabling an RF module used for high-speed data transmission.

According to the standby control method provided in the embodiments of this application, disabling the first communication link by the terminal may be disabling the RF module used for high-speed data transmission, and enabling the first communication link may also be enabling the RF module used for high-speed data transmission. Therefore, a method for enabling or disabling the first communication link is provided for the terminal, so that the solution is more feasible.

Based on the first implementation of the second aspect of the embodiments of this application or the second implementation of the second aspect of the embodiments of this application, in a third implementation of the second aspect of the embodiments of this application, the wakeup packet includes a channel parameter of the first communication link; and the first communication link is enabled based on the channel parameter, to perform service communication with the relay device through the first communication link.

According to the standby control method provided in the embodiments of this application, when the terminal is woken up, the terminal may resume service communication by using the channel parameter of the first communication link that is obtained in the wakeup packet, thereby increasing a networking speed when the terminal is woken up.

Based on any one of the second implementation of the second aspect of the embodiments of this application or the third implementation of the second aspect of the embodiments of this application, in a fourth implementation of the second aspect of the embodiments of this application, before the disabling the first communication link, the method further includes: sending second notification information to the relay device through the first communication link, to notify the relay device that the RF module is to be disabled.

According to the standby control method provided in the embodiments of this application, before the terminal enters the standby mode, the terminal may send the second notification information to the relay device to notify that the terminal is to enter the standby mode, disable the RF module, and stop transmitting data through the first communication link.

Based on any one of the second aspect of the embodiments of this application and the first implementation of the second aspect of the embodiments of this application to the fourth implementation of the second aspect of the embodiments of this application, in a fifth implementation of the second aspect of the embodiments of this application, a communication resource occupied by the acknowledgement information of the second keep-alive packet is smaller than a communication resource occupied by the second keep-alive packet.

According to the standby control method provided in the embodiments of this application, after entering the standby mode, the terminal keeps a heartbeat connection to the relay device by using the second communication link. The relay device sends the second keep-alive packet to the terminal. The terminal receives the second keep-alive packet and returns the acknowledgement information of the second keep-alive packet. Because the communication resource occupied by the acknowledgement information of the second keep-alive packet is smaller than the communication resource occupied by the second keep-alive packet, power consumption of the terminal in the standby mode can be further reduced.

Based on the second aspect of the embodiments of this application and the first implementation of the second aspect of the embodiments of this application to the fifth implementation of the second aspect of the embodiments of this application, in a sixth implementation of the second aspect of the embodiments of this application, before the disabling the first communication link, the method further includes: negotiating with the relay device about a heartbeat period by using the first communication link; and the receiving a second keep-alive packet sent by the relay device through a second communication link specifically includes: receiving the second keep-alive packet sent by the relay device through the second communication link based on the heartbeat period.

According to the standby control method provided in the embodiments of this application, before the terminal enters the standby mode, the terminal may further negotiate with the relay device about the heartbeat period by using the first communication link. Therefore, a more specific implementation of the heartbeat connection is provided, so that the solution is more flexible.

A third aspect of the embodiments of this application provides a standby control method, including: receiving first notification information sent by a terminal through a first communication link; under an instruction of the first notification information, serving as a proxy for the terminal to send a first keep-alive packet to a cloud server, so that the cloud server confirms that the terminal is online; sending a second keep-alive packet to the terminal through a second communication link; and receiving, through the second communication link, acknowledgement information that is of the second keep-alive packet and that is returned by the terminal, and confirming, based on the acknowledgement information, that the terminal is online, where a communication rate of the second communication link is lower than a communication rate of the first communication link.

According to the standby control method provided in the embodiments of this application, a relay device may keep a connection to the terminal by using the first communication link, and transmit business service data. When the terminal enters a standby mode, the terminal disables the first communication link, and a second communications module of the relay device performs a heartbeat keep-alive operation with a second communications module of the terminal by using the second communication link. The communication rate of the second communication link is lower than the communication rate of the first communication link. In comparison with a heartbeat keep-alive operation performed by using the first communication link when the terminal is in the standby mode, in the embodiments of this application, power consumption of the terminal in the standby mode is reduced.

Based on the third aspect of the embodiments of this application, in a first implementation of the third aspect of the embodiments of this application, the method further includes: sending a wakeup packet to the terminal through the second communication link, so that the terminal enables a main control CPU and the first communication link based on the wakeup packet.

According to the standby control method provided in the embodiments of this application, when the terminal is in the standby mode, the relay device may send the wakeup packet to the terminal through the second communication link, to wake up the terminal. Therefore, a specific manner of waking up the terminal is provided, so that the solution is more feasible.

Based on the first implementation of the third aspect of the embodiments of this application, in a second implementation of the third aspect of the embodiments of this application, the enabling the first communication link includes enabling an RF module used for high-speed data transmission.

According to the standby control method provided in the embodiments of this application, disabling the first communication link by the terminal may be disabling the RF module used for high-speed data transmission, and enabling the first communication link may also be enabling the RF module used for high-speed data transmission. Therefore, a method for enabling or disabling the first communication link is provided, so that the solution is more feasible.

Based on the first implementation of the third aspect of the embodiments of this application or the second implementation of the third aspect of the embodiments of this application, in a third implementation of the third aspect of the embodiments of this application, the wakeup packet includes a channel parameter of the first communication link; and after the terminal enables the first communication link based on the channel parameter, service communication is performed with the terminal through the first communication link.

According to the standby control method provided in the embodiments of this application, when waking up the terminal, the relay device may add the channel parameter of the first communication link to the wakeup packet to resume service communication, thereby increasing a networking speed when the terminal is woken up.

Based on any one of the third aspect of the embodiments of this application, the first implementation of the third aspect of the embodiments of this application, or the third implementation of the third aspect of the embodiments of this application, in a fourth implementation of the third aspect of the embodiments of this application, before the sending a second keep-alive packet to the terminal through a second communication link, the method further includes: receiving second notification information sent by the terminal through the first communication link; and setting, based on the second notification information, the terminal to be in a connected state on the first communication link.

According to the standby control method provided in the embodiments of this application, before the terminal enters the standby mode, the relay device may receive, through the first communication link, the second notification information sent by the terminal, and set a connection status of the terminal on the first communication link to an always-online state through parameter setting, so that even if a preset time limit is exceeded, the relay device does not determine that the terminal is offline.

Based on any one of the third aspect of the embodiments of this application, the first implementation of the third aspect of the embodiments of this application, or the fourth implementation of the third aspect of the embodiments of this application, in a fifth implementation of the third aspect of the embodiments of this application, when the acknowledgement information that is of the second keep-alive packet and that is returned by the terminal has not been received within a preset time limit, sending the first keep-alive packet to the cloud server is stopped, so that the terminal is disconnected from the cloud server.

According to the standby control method provided in the embodiments of this application, after the terminal enters the standby mode, when the relay device has not received the acknowledgement information of the second keep-alive packet from the terminal within the preset time limit, the relay device determines that the terminal is offline, and stops performing a cloud keep-alive operation on the terminal, in other words, sending the first keep-alive packet to the cloud server, so that the relay device is prevented from always performing a cloud service as a proxy after the terminal is offline.

Based on any one of the third aspect of the embodiments of this application, the first implementation of the third aspect of the embodiments of this application, or the fifth implementation of the third aspect of the embodiments of this application, in a sixth implementation of the third aspect of the embodiments of this application, a communication resource occupied by the acknowledgement information of the second keep-alive packet is smaller than a communication resource occupied by the second keep-alive packet.

According to the standby control method provided in the embodiments of this application, after the terminal enters the standby mode, the relay device keeps a heartbeat connection to the terminal by using the second communication link. The relay device sends the second keep-alive packet to the terminal. The terminal receives the second keep-alive packet and returns the acknowledgement information of the second keep-alive packet. Because the communication resource occupied by the acknowledgement information of the second keep-alive packet is smaller than the communication resource occupied by the second keep-alive packet, power consumption of the terminal in the standby mode can be further reduced.

Based on any one of the third aspect of the embodiments of this application, the first implementation of the third aspect of the embodiments of this application, or the sixth implementation of the third aspect of the embodiments of this application, in a seventh implementation of the third aspect of the embodiments of this application, before the sending a second keep-alive packet to the terminal through a second communication link, the method further includes: negotiating with the terminal about a heartbeat period by using the first communication link; and the sending a second keep-alive packet to the terminal through a second communication link specifically includes: sending the second keep-alive packet to the terminal through the second communication link based on the heartbeat period.

According to the standby control method provided in the embodiments of this application, before the terminal enters the standby mode, the relay device may further negotiate with the terminal about the heartbeat period by using the first communication link. Therefore, a more specific implementation of sending the second keep-alive packet is provided, so that the solution is more feasible. Because the second keep-alive packet is periodically sent, communication resources can be further reduced, and power consumption can be reduced.

A fourth aspect of the embodiments of this application provides a terminal, including a main control module, a first communications module, and a second communications module. The main control module is configured to: after a standby instruction is received, control the first communications module to send first notification information to a relay device through a first communication link. The first notification information is used to instruct the relay device to serve as a proxy for the terminal to send a first keep-alive packet to a cloud server, and the first communication link is a communication link between the first communications module and the relay device. The main control module is further configured to disable the first communication link and a main control central processing unit (CPU). The second communications module is configured to: receive a second keep-alive packet sent by the relay device through a second communication link, and return acknowledgement information of the second keep-alive packet, so that the relay device confirms that the terminal is online. The second communication link is a communication link between the second communications module and the relay device, and a communication rate of the second communication link is lower than a communication rate of the first communication link.

The terminal provided in the embodiments of this application is connected to the relay device through the first communication link. When the terminal enters a standby mode, the terminal disables the first communication link, and the second communications module of the terminal performs a heartbeat keep-alive operation with the relay device by using the second communication link. The communication rate of the second communication link is lower than the communication rate of the first communication link.

In comparison with a heartbeat keep-alive operation performed by using the first communication link when the terminal is in the standby mode, in the embodiments of this application, power consumption of the terminal in the standby mode is reduced.

Based on the fourth aspect of the embodiments of this application, in a first implementation of the fourth aspect of the embodiments of this application, the second communications module is further configured to: receive a wakeup packet sent by the relay device through the second communication link; instruct, based on the wakeup packet, the main control module to enable the CPU; and instruct, based on the wakeup packet, the main control module to enable the first communication link.

According to the terminal provided in the embodiments of this application, when the terminal is in the standby mode, the second communications module receives, through the second communication link, the wakeup packet sent by the relay device, and is woken up based on the wakeup packet, to restore a normal service mode from the standby mode. Therefore, a specific manner of waking up the terminal is provided, so that the solution is more feasible.

Based on the fourth aspect of the embodiments of this application or the first implementation of the fourth aspect of the embodiments of this application, the disabling the first communication link includes: disabling, by the first communications module, an RF module used for high-speed data transmission.

According to the terminal provided in the embodiments of this application, disabling the first communication link by the terminal may be disabling the RF module used for high-speed data transmission, and enabling the first communication link may also be enabling the RF module used for high-speed data transmission. Therefore, a method for enabling or disabling the first communication link is provided for the terminal, so that the solution is more feasible.

Based on the first implementation of the fourth aspect of the embodiments of this application or the second implementation of the fourth aspect of the embodiments of this application, in a third implementation of the fourth aspect of the embodiments of this application, the wakeup packet includes a channel parameter of the first communication link; and the first communications module is further configured to enable the first communication link based on the channel parameter, to perform service communication with the relay device through the first communication link.

According to the terminal provided in the embodiments of this application, when the terminal is woken up, the terminal may resume service communication by using the channel parameter of the first communication link that is obtained in the wakeup packet, thereby increasing a networking speed when the terminal is woken up.

Based on the second implementation of the fourth aspect of the embodiments of this application or the third implementation of the fourth aspect of the embodiments of this application, in a fourth implementation of the fourth aspect of the embodiments of this application, the main control module is further configured to send second notification information to the relay device through the first communication link, to notify the relay device that the RF module is to be disabled.

According to the terminal provided in the embodiments of this application, before the terminal enters the standby mode, the main control module may send the second notification information to the relay device through the first communication link, to notify that the terminal is to enter the standby mode, disable the RF module, and stop transmitting data through the first communication link.

Based on the fourth aspect of the embodiments of this application and the first implementation of the fourth aspect of the embodiments of this application to the fourth implementation of the fourth aspect of the embodiments of this application, in a fifth implementation of the fourth aspect of the embodiments of this application, the main control module is further configured to negotiate with the relay device about a heartbeat period by using the first communication link; and the second communications module is specifically configured to receive the second keep-alive packet sent by the relay device through the second communication link based on the heartbeat period.

According to the terminal provided in the embodiments of this application, before the terminal enters the standby mode, the main control module may further negotiate with the relay device about the heartbeat period by using the first communication link. Therefore, a more specific implementation of a heartbeat connection is provided, so that the solution is more flexible.

A fifth aspect of the embodiments of this application provides a relay device, including a first communications module and a second communications module. The first communications module is configured to receive first notification information sent by a terminal through a first communication link. The first communications module is further configured to serve as a proxy for the terminal to send a first keep-alive packet to a cloud server, so that the cloud server confirms that the terminal is online. The second communications module is configured to send a second keep-alive packet to the terminal through a second communication link. The second communications module is further configured to: receive, through the second communication link, acknowledgement information that is of the second keep-alive packet and that is returned by the terminal, and confirm, based on the acknowledgement information, that the terminal is online. A communication rate of the second communication link is lower than a communication rate of the first communication link.

According to the relay device provided in the embodiments of this application, the relay device may keep a connection to the terminal by using the first communication link, and transmit business service data. When the terminal enters a standby mode, the terminal disables the first communication link, and the second communications module of the relay device performs a heartbeat keep-alive operation with a second communications module of the terminal by using the second communication link. The communication rate of the second communication link is lower than the communication rate of the first communication link. In comparison with a heartbeat keep-alive operation performed by using the first communication link when the terminal is in the standby mode, in the embodiments of this application, power consumption of the terminal in the standby mode is reduced.

Based on the fifth aspect of the embodiments of this application, in a first implementation of the fifth aspect of the embodiments of this application, the second communications module is further configured to send a wakeup packet to the terminal through the second communication link, so that the terminal enables a main control CPU and the first communication link based on the wakeup packet.

According to the relay device provided in the embodiments of this application, when the terminal is in the standby mode, the second communications module may send the wakeup packet to the terminal through the second communication link, to wake up the terminal. Therefore, a specific manner of waking up the terminal is provided, so that the solution is more feasible.

Based on the first implementation of the fifth aspect of the embodiments of this application, in a second implementation of the fifth aspect of the embodiments of this application, the enabling the first communication link includes enabling an RF module used for high-speed data transmission.

According to the relay device provided in the embodiments of this application, disabling the first communication link by the terminal may be disabling the RF module used for high-speed data transmission, and enabling the first communication link may also be enabling the RF module used for high-speed data transmission. Therefore, a method for enabling or disabling the first communication link is provided, so that the solution is more feasible.

Based on the first implementation of the fifth aspect of the embodiments of this application or the second implementation of the fifth aspect of the embodiments of this application, in a third implementation of the fifth aspect of the embodiments of this application, the wakeup packet includes a channel parameter of the first communication link; and the first communications module is further configured to: after the terminal enables the first communication link based on the channel parameter, perform service communication with the terminal through the first communication link.

According to the relay device provided in the embodiments of this application, when waking up the terminal, the relay device may add the channel parameter of the first communication link to the wakeup packet to resume service communication, thereby increasing a networking speed when the terminal is woken up.

Based on the fifth aspect of the embodiments of this application, the first implementation of the fifth aspect of the embodiments of this application, or the third implementation of the fifth aspect of the embodiments of this application, in a fourth implementation of the fifth aspect of the embodiments of this application, the first communications module is further configured to: receive second notification information sent by the terminal through the first communication link, to learn that the terminal is to disable the RF module; and set, based on the second notification information, the terminal to be in an online state on the first communication link.

According to the relay device provided in the embodiments of this application, before the terminal enters the standby mode, the first communications module may receive, through the first communication link, the second notification information sent by the terminal, and set a connection status of the terminal on the first communication link to an always-online state through parameter setting, so that even if a preset time limit is exceeded, the relay device does not determine that the terminal is offline.

Based on the fifth aspect of the embodiments of this application, the first implementation of the fifth aspect of the embodiments of this application, or the fourth implementation of the fifth aspect of the embodiments of this application, in a fifth implementation of the fifth aspect of the embodiments of this application, the first communications module is further configured to: when the second communications module has not received, within a preset time limit, the acknowledgement information that is of the second keep-alive packet and that is returned by the terminal, stop sending the first keep-alive packet to the cloud server, so that the terminal is disconnected from the cloud server.

According to the relay device provided in the embodiments of this application, after the terminal enters the standby mode, when the relay device has not received the acknowledgement information of the second keep-alive packet from the terminal within the preset time limit, the relay device determines that the terminal is offline, and the first communications module stops performing a cloud keep-alive operation on the terminal, in other words, sending the first keep-alive packet to the cloud server, so that the relay device is prevented from always performing a cloud service as a proxy after the terminal is offline.

Based on the fifth aspect of the embodiments of this application, the first implementation of the fifth aspect of the embodiments of this application, or the fifth implementation of the fifth aspect of the embodiments of this application, in a sixth implementation of the fifth aspect of the embodiments of this application, the second communications module is further configured to: before the second communications module sends the second keep-alive packet to the terminal through the second communication link, negotiate with the terminal about a heartbeat period by using the first communication link; and the second communications module is further configured to send the second keep-alive packet to the terminal through the second communication link based on the heartbeat period.

According to the relay device provided in the embodiments of this application, after the terminal enters the standby mode, the second communications module keeps a heartbeat connection to the terminal by using the second communication link. The relay device sends the second keep-alive packet to the terminal. The terminal receives the second keep-alive packet and returns the acknowledgement information of the second keep-alive packet. Because a communication resource occupied by the acknowledgement information of the second keep-alive packet is smaller than a communication resource occupied by the second keep-alive packet, power consumption of the terminal in the standby mode can be further reduced.

A sixth aspect of the embodiments of this application provides a terminal. The terminal includes a processor and a memory, and the processor performs, by running a software program stored in the memory and invoking data stored in the memory, the method in the implementations provided in the second aspect of the embodiments of this application.

A seventh aspect of the embodiments of this application provides a relay device. The relay device includes a processor and a memory, and the processor performs, by running a software program stored in the memory and invoking data stored in the memory, the method in the implementations provided in the third aspect of the embodiments of this application.

An eighth aspect of the embodiments of this application provides a computer program product. The computer program product includes a computer program instruction, and the computer program instruction may be loaded by using a processor to implement the method in the second aspect and the implementations of the second aspect.

A ninth aspect of the embodiments of this application provides a computer program product. The computer program product includes a computer program instruction, and the computer program instruction may be loaded by using a processor to implement the method in the third aspect and the implementations of the third aspect.

A tenth aspect of the embodiments of this application provides a computer storage medium, configured to store a computer program instruction. The computer program instruction includes programs used to perform the steps in the implementations provided in the second aspect of the embodiments of this application.

An eleventh aspect of the embodiments of this application provides a computer storage medium, configured to store a computer program instruction. The computer program instruction includes programs used to perform the steps in the implementations provided in the third aspect of the embodiments of this application.

DESCRIPTION OF EMBODIMENTS

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "at least one of the following" or a similar expression thereof indicates any combination of the items, including any combination of one or more of the items. For example, at least one of a, b, and c may indicate a, b, c, "a and b", "a and c", "b and c", or "a, b, and c", where a, b, and c may be singular or plural.

The embodiments of this application provide a standby control method, to reduce power consumption of a terminal in a standby mode.

Figure 1:
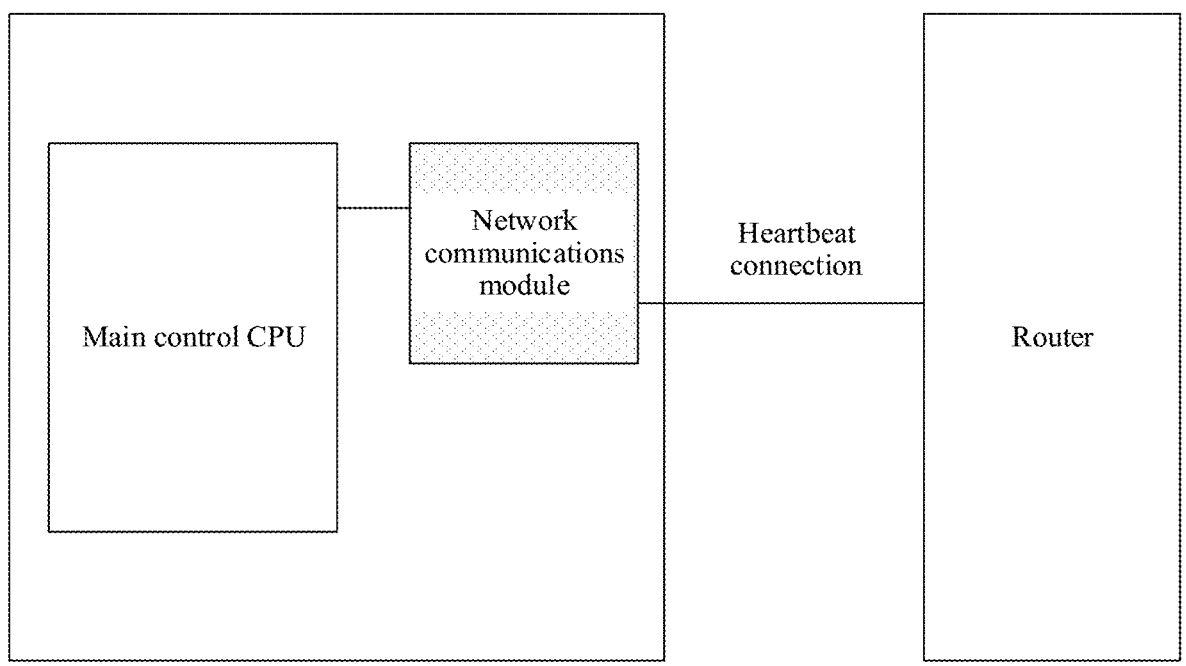
FIG. 1 is a schematic diagram of a terminal in a standby mode.

FIG. 1 is a schematic diagram of a terminal in a standby mode. In a common terminal standby method, the terminal communicates with a router by using a network communications module. The terminal mainly includes a main control central processing unit (CPU) and the network communications module. When the terminal is in the standby mode, the main control CPU is in a power-off state, and the network communications module keeps a heartbeat connection to the router, so that quick networking and remote wakeup can be supported. When the terminal is in the standby mode, the network communications module keeps a heartbeat connection to the router. Therefore, power consumption is relatively high.

Figure 2:
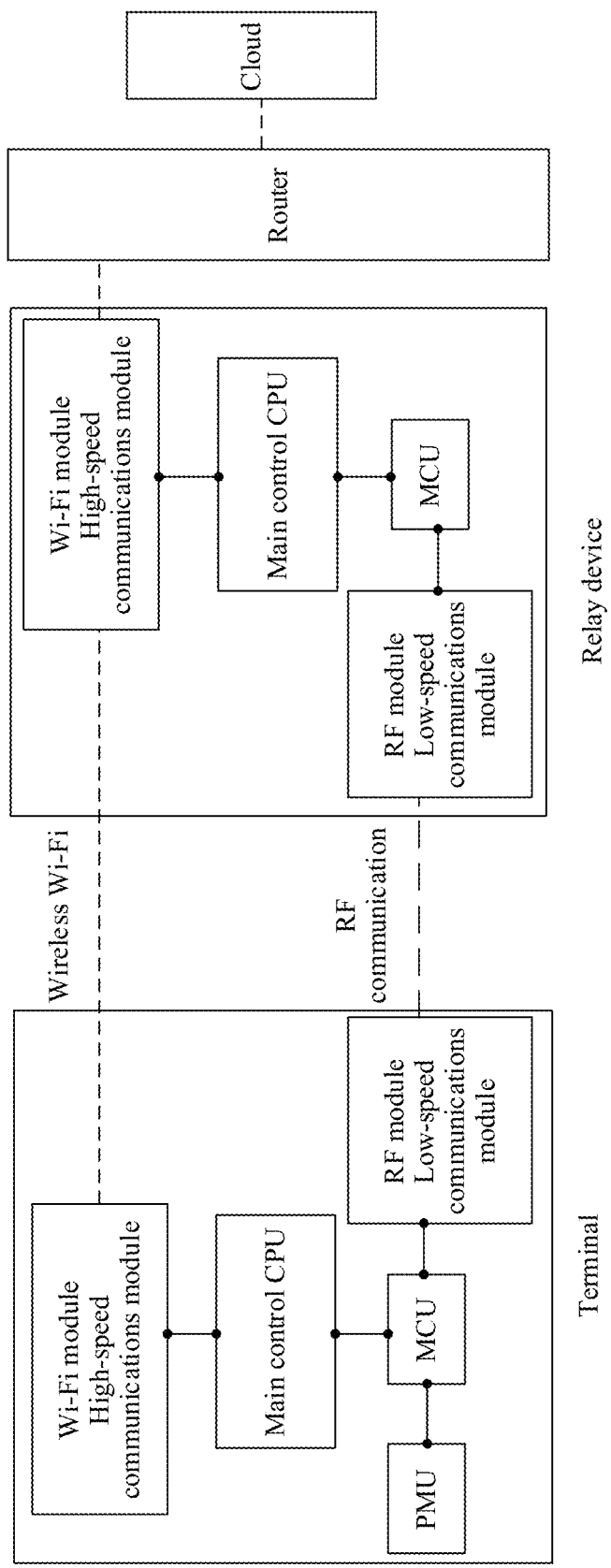
FIG. 2 is a diagram of a terminal networking architecture according to an embodiment of this application.

FIG. 2 is a diagram of a terminal networking architecture according to an embodiment of this application. The architecture may be used in a scenario such as terminal video data transmission. In this embodiment of this application, a relay device is added to the terminal networking architecture, a terminal is communicatively connected to a router by using the relay device, and the terminal is communicatively connected to the cloud by using the relay device and the router.

A composition structure of the terminal mainly includes a main control CPU, a wireless fidelity (Wi-Fi) module, a microcontroller unit (MCU), a power management unit (PMU), and a radio frequency (RF) module. The RF module is added to the structure of the terminal in this embodiment of this application.

For example, the main control CPU, which may be, for example, a camera CPU or a set-top-box CPU, is responsible for running media services such as a login service, a push service, and an on-demand service. Optionally, the main control CPU may include at least one of the following types: a general-purpose central processing unit, a digital signal processor (DSP), a microprocessor, or a microcontroller unit (MCU). For example, the main control CPU may be a single-CPU processor or a multi-CPU processor. Alternatively, the main control CPU may be a processor group including a plurality of processors, and the plurality of processors are coupled to each other through one or more buses. The main control CPU may include an analog-to-digital converter (ADC) and a digital-to-analog converter (DAC) to implement a signal connection between different components of the apparatus. The MCU is used for power control and external event detection. The PMU can supply power to the main control CPU and the modules of the terminal. The Wi-Fi module, namely, a high-speed communications module, may be the 4th generation mobile communication technology (4G) wireless module or the like. The Wi-Fi module is configured to perform service communication. For example, a network communications module may include a central processing unit CPU or a microcontroller unit MCU and a radio frequency transceiver (which may also be referred to as a radio frequency circuit).

The RF module is a wakeup module, for example, may be a Bluetooth module. The RF module is configured to send a keep-alive packet to the relay device when the terminal is in a standby mode, to keep a heartbeat connection to the relay device, and may further receive a wakeup packet sent by the relay device, to wake up the terminal in the standby mode. Power consumption of the RF module is lower than that of the Wi-Fi module. Reasons for low power consumption of the RF module may be as follows: Bandwidth of a monitored frequency is narrow, an amount of carried data is small, and therefore low energy consumption is required. A protocol is simple, logic processing of a chip is simple, and power consumption is low. It should be noted that the RF module of the terminal may be integrated into the terminal or separately exist as external hardware. It should be understood that, when the RF module of the terminal separately exists as external hardware, in an optional case, the RF module of the terminal may be connected to the terminal through a serial peripheral interface (SPI).

A composition structure of the relay device mainly includes a main control CPU, a Wi-Fi module, an MCU, and an RF module.

A proxy module of the relay device is further disposed in the structure of the relay device. The proxy module may be integrated into the Wi-Fi module of the relay device, or may be implemented in a module other than the Wi-Fi module of the relay device. Functions of the proxy module of the relay device include a cloud service keep-alive function, remote terminal wakeup, terminal IP address and router DHCP lease renewal, and the like.

The main control CPU of the relay device may be configured to be responsible for running a media service. The Wi-Fi module, namely, a network communications module, is a high-speed communications module, and may be a 4G wireless module or the like. The Wi-Fi module is configured to perform service communication with the terminal. The RF module is a wakeup module, and may be a Bluetooth module or the like. The RF module is configured to: keep a heartbeat connection to the terminal when the terminal is in the standby mode, and send a wakeup packet to the RF module of the terminal to remotely wake up the terminal. It should be noted that the RF module of the relay device may be integrated into the relay device or separately exist as external hardware. It should be understood that, when the RF module of the relay device separately exists as external hardware, in an optional case, the RF module of the relay device may be connected to the relay device through a serial peripheral interface.

It should be understood that each of the Wi-Fi module of the terminal and the Wi-Fi module of the relay device includes an RF module, and an amount of data transmitted by the RF module of the Wi-Fi module in a unit time is large. In an optional case, the amount of data transmitted by the RF module of the Wi-Fi module in a unit time is greater than 10 M. However, an amount of data that can be transmitted, in a unit time, by the RF module used for a wake-up function is small. In an optional case, the amount of data transmitted, in a unit time, by the RF module used for the wakeup function is less than 1 M.

In the terminal networking architecture in this embodiment of this application, when the terminal is in a normal service mode, both the main control CPU and the Wi-Fi module are in a power-on state, the terminal is connected to and communicates with the router and the cloud based on a first communication link by using the Wi-Fi module, and the RF module is in the standby mode or powered off. When the terminal enters the standby mode, the main control CPU of the terminal is powered off, and power is not supplied to most function modules of the Wi-Fi module. For example, the network communications module disables the radio frequency module and stops transceiving data, power is supplied only to some modules to maintain memory refresh, and the terminal keeps a heartbeat connection to the relay device based on a second communication link by using the RF module, and keeps a connection to the cloud by using the relay device. In this case, the Wi-Fi module is in an ultra-low power consumption mode. Because the power consumption of the RF module is lower than that of the Wi-Fi module, in comparison with a heartbeat connection performed by the terminal by using the Wi-Fi module in the prior art, power consumption of the terminal in the standby mode is reduced. In an optional case, the first communication link is a wireless Wi-Fi communication link, and has a high transmission rate, and the second communication link is an RF communication link, and has a low transmission rate. Compared with the first communication link, the second communication link corresponds to a new air interface and is based on a simple data protocol. For example, the simple data protocol is attributed to low carrier complexity and low protocol transmission complexity.

Figure 3:
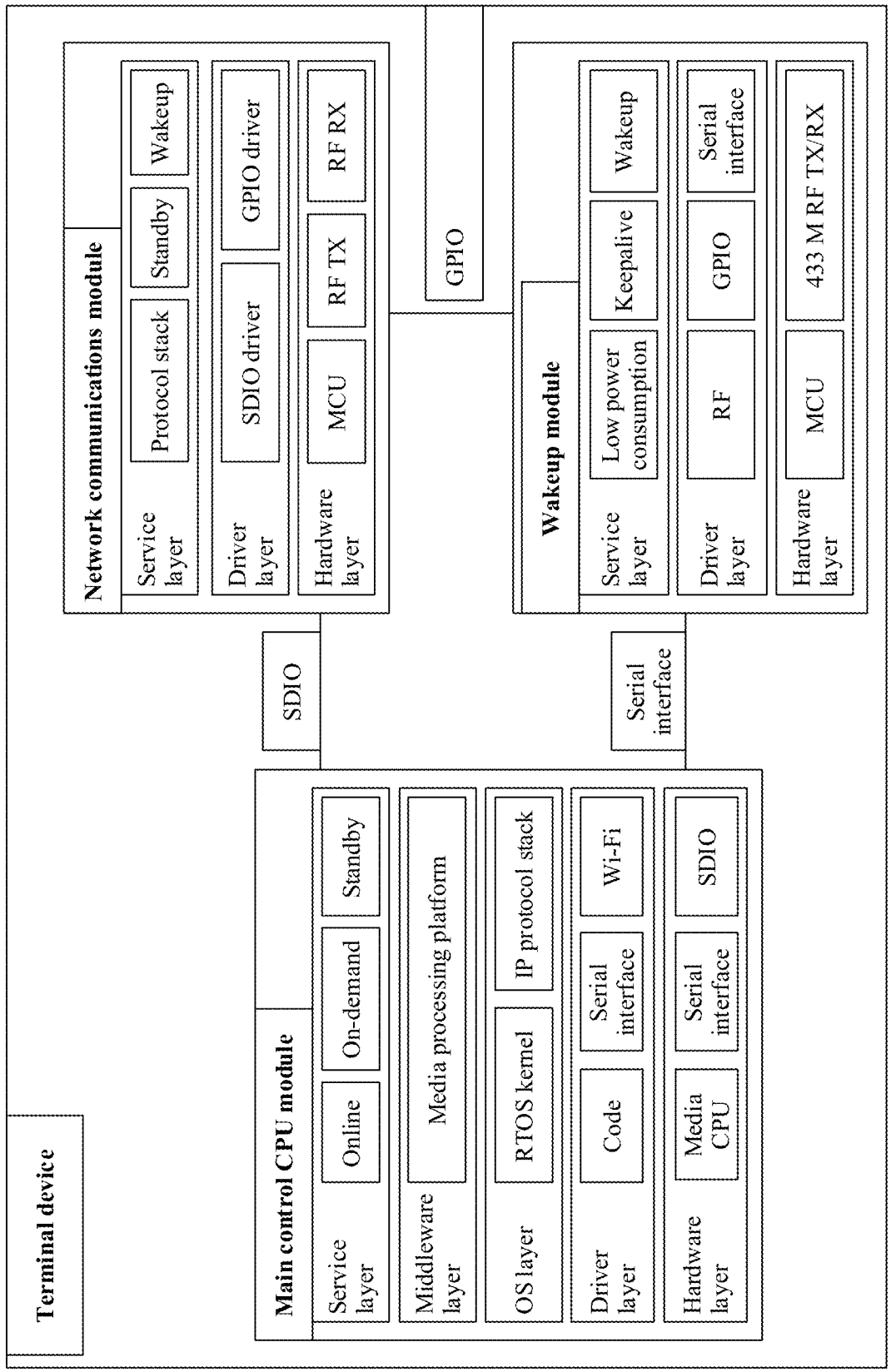
FIG. 3 is a schematic diagram of a layering model of a terminal according to an embodiment of this application.

FIG. 3 is a schematic diagram of a layering model of a terminal according to an embodiment of this application.

The terminal includes a main control CPU, a network communications module, and a wakeup module. The main control CPU module and the network communications module may be connected through a peripheral interface, namely, secure digital input/output (SDIO). The SDIO interface may be used to transmit a data block. The main control CPU and the wakeup module may be connected through a serial interface, and the network communications module and the wakeup module may be connected through general purpose input/output (GPIO).

The main control CPU may include a service layer, a middleware layer, an operating system (OS) layer, a driver layer, and a hardware layer. The driver layer is an interface of the hardware layer. The OS layer can control working of the hardware device only by using the driver layer.

A standby function of the service layer may include a function used for terminal standby control. An RTOS of the OS layer is a real-time operating system (RTOS). Serial interfaces of the driver layer and the hardware layer are jointly connected to the wakeup module.

The network communications module may include a service layer, a driver layer, and a hardware layer. The service layer includes standby and wakeup functions, and may be used for terminal standby control. A GPIO driver of the driver layer is used to perform a GPIO connection to the wakeup module, and an SDIO driver is used to connect to the main control CPU to transmit a data block through an SDIO interface. RF TX of the hardware layer is a radio frequency transmission unit, and RF RX is a radio frequency receiving unit.

The wakeup module may include a service layer, a driver layer, and a hardware layer. The service layer may complete a low power consumption function, a keep-alive function, and a wakeup function, used to: during terminal standby control, perform a heartbeat keep-alive operation between the terminal and a relay device by using the wakeup module and a second communication link, and maintain a low power consumption connection between the terminal and the relay device; or when the terminal is woken up by the cloud, receive a wakeup packet through a second communication link by using the wakeup module to wake up the terminal. A serial interface of the driver layer is used to control a connection between the hardware and the main control CPU. 433 M RF of the hardware layer is a radio frequency module with a frequency of 433 megabytes, used to establish the second communication link with the relay device to perform a heartbeat keep-alive operation when the terminal is in a standby mode.

The main control CPU module, the network communications module, and the wakeup module of the terminal may implement the standby control method in the embodiments of this application by using the layering model. For specific steps performed by the terminal, refer to the embodiment corresponding to FIG. 6.

Figure 4:
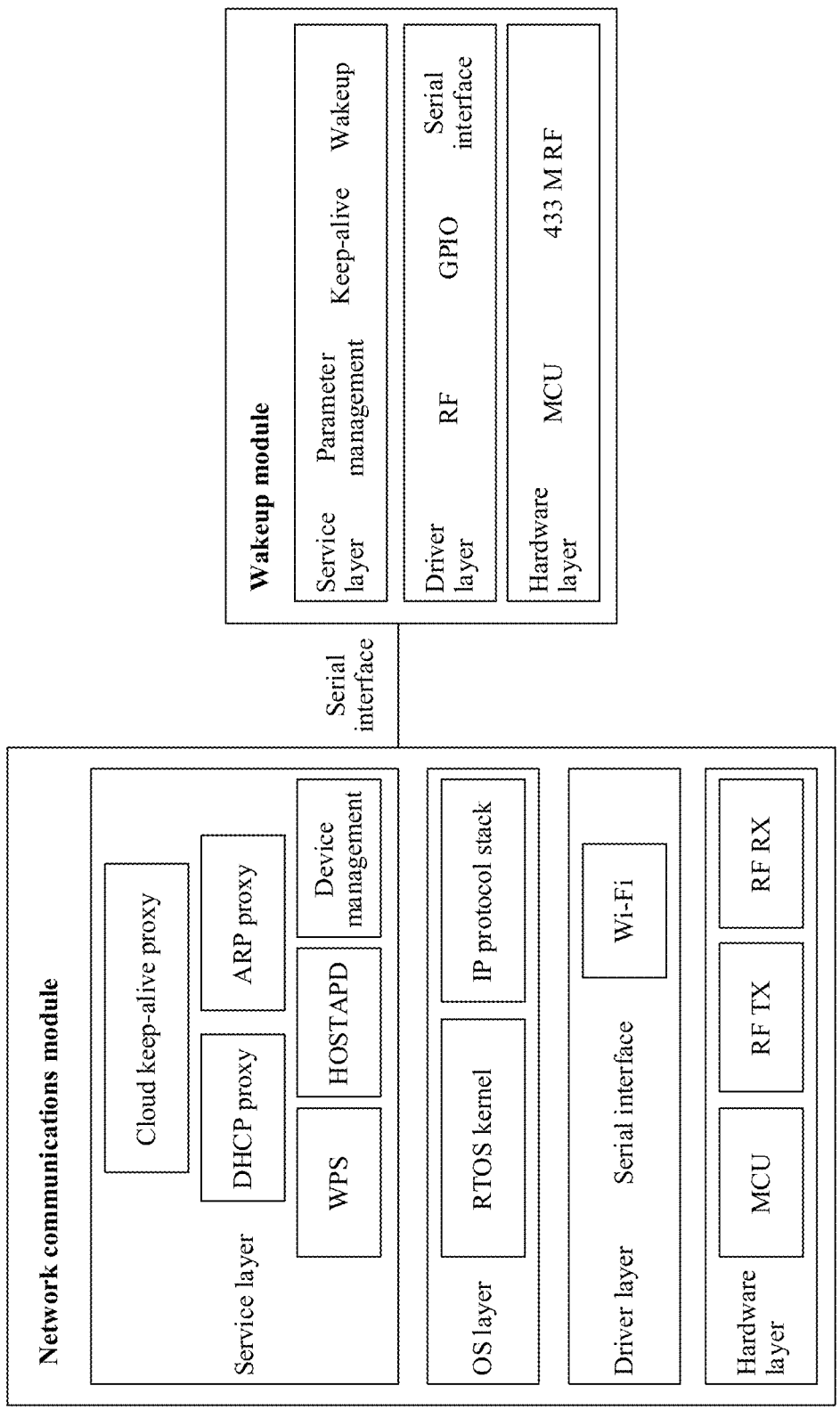
FIG. 4 is a schematic diagram of a layering model of a relay device according to an embodiment of this application.

The foregoing describes the schematic diagram of the layering model of the terminal in the embodiments of this application. With reference to FIG. 4, the following describes a schematic diagram of layering model of a relay device in the embodiments of this application.

The relay device includes a main control CPU module, a network communications module, and a wakeup module. The network communications module and the wakeup module may be connected through a serial interface.

The network communications module of the relay device may include a service layer, an OS layer, a driver layer, and a hardware layer. The driver layer is an interface of the hardware layer. The OS layer can control working of the hardware device only by using the driver layer.

HOSTAPD of the service layer of the relay device may complete two functions in a standby control method: (1) obtaining a channel parameter and a device IP parameter from the network communications module; and (2) setting a device online non-timeout function. A cloud keep-alive proxy may serve as a proxy for a terminal to send a first keep-alive packet to the relay device. By using a dynamic host configuration protocol (DHCP) proxy, the relay device sends a DHCP lease renewal packet to a router, to renew an IP address lease. A gratuitous address resolution protocol (ARP) proxy sends an ARP packet or the like to the router to keep a connection to the router, preventing an ARP table of the router from aging. An RTOS of the OS layer is a real-time operating system.

The wakeup module may include a service layer, a driver layer, and a hardware layer. An RTOS is a real-time operating system (RTOS), RF is a radio frequency module, 433 M RF is a radio frequency module with a frequency of 433 megabytes, RF TX is a radio frequency transmission unit, and RF RX is a radio frequency receiving unit. Parameter management of the service layer is used to negotiate about a parameter related to a keep-alive operation and a heartbeat period and construct a wakeup packet. RF of the driver layer is used to drive the RF module to send a keep-alive packet or a wakeup packet through a second communication link.

The network communications module and the wakeup module of the relay device may implement the standby control method in the embodiments of this application by using the layering model. For specific steps performed by the relay device, refer to the embodiment corresponding to FIG. 6.

Figure 5:
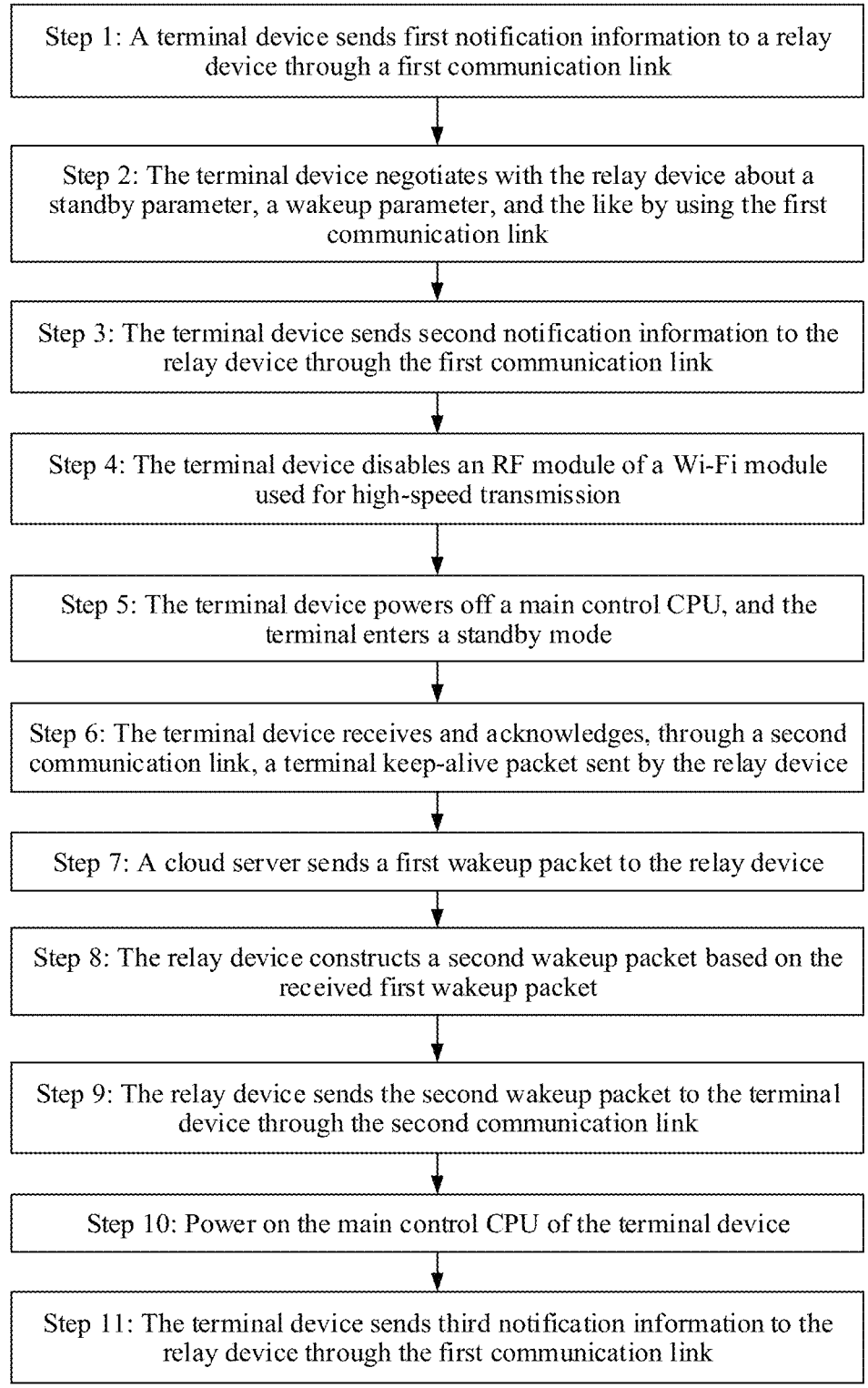
FIG. 5 is an interaction flowchart of a standby control method according to an embodiment of this application.

Based on the diagram of the terminal networking architecture in FIG. 2, the following describes a standby control method provided in an embodiment of this application. FIG. 5 is an interaction flowchart of a standby control method according to an embodiment of this application.

When a terminal enters a standby mode, a main control CPU is powered off, and a network communications module (which, for example, may be a Wi-Fi module, namely, a high-speed communications module) disables an RF module used for high-speed data transmission and stops transceiving data, and only a small amount of power is retained to maintain memory refresh of the Wi-Fi module. Instead of the Wi-Fi module used for high-speed communication, an RF module used for low-speed communication periodically sends a keep-alive packet to a relay device through a low-speed communication link, so that the terminal keeps a heartbeat connection to a cloud server by using the relay device. Therefore, before entering the standby mode, the terminal needs to negotiate with the relay device about preparations required for a keep-alive operation.

The standby control method specifically includes the following steps.

Step 1: After receiving a standby instruction, the terminal enters the standby mode, and sends first notification information to the relay device through a first communication link, where the first notification information is used to instruct the relay device to serve as a proxy for the terminal to send a first keep-alive packet to the cloud server after the terminal enters the standby mode, to notify the cloud server that the terminal is still alive. Optionally, the keep-alive packet may also be referred to as a heartbeat packet. It should be understood that a heartbeat usually refers to sending a custom instruction to one of two communication parties by the other party to determine whether the party is alive, and the keep-alive packet is usually sent at specific intervals, which is similar to a heartbeat, and therefore, is further referred to as a heartbeat instruction.

For example, the first communication link is a wireless Wi-Fi communication link between the Wi-Fi module, namely, the high-speed communications module, of the terminal and a Wi-Fi module, namely, a high-speed communications module, of the relay device, and the first communication link is a high-speed communication link. When being in a normal service mode, the terminal performs service and data communication with the cloud server through the first communication link. For example, the relay device keeps a connection to a router by sending a DHCP lease renewal packet, an ARP packet, and the like to the router, and further keeps a connection to the cloud server by using the router. The DHCP lease renewal packet may be used to renew an IP address lease, and the gratuitous ARP packet is used to prevent an ARP table of the router from aging. In an optional case, the relay device periodically sends the DHCP lease renewal packet and the gratuitous ARP packet to the router, and a sending period may be 30 seconds to 60 seconds. Because always sending a keep-alive packet excessively wastes resources and increases system power consumption, in this embodiment of this application, a keep-alive packet is periodically sent, properly reducing system power consumption while ensuring that the relay device keeps a connection to the cloud server. It should be understood that the router has an aging period, and feature information (for example, an ARP table and a NAT table) of the terminal that is stored in the router is cleared each time the aging period is reached. To prevent the router from aging, the period of sending the DHCP lease renewal packet and the gratuitous ARP packet to the router by the relay device needs to be shorter than the aging period of the router. The period of sending the packet to the router by the relay device is not specifically limited in this embodiment of this application.

For example, the relay device serves as a proxy for the terminal to send a cloud keep-alive packet to the cloud server, so that the cloud server considers that the terminal is connected to the cloud server. Optionally, a period of sending the cloud keep-alive packet by the relay device may be 30 seconds to 60 seconds.

Step 2: The terminal negotiates with the relay device about a standby parameter, a wakeup parameter, and the like by using the first communication link.

For example, the standby parameter includes a period of sending a terminal keep-alive packet to the terminal by the relay device when the terminal is in the standby mode. Optionally, the keep-alive packet may also be referred to as a heartbeat packet. For example, the period of sending the terminal keep-alive packet to the terminal by the relay device when the terminal is in the standby mode may be 5 seconds to 10 seconds. However, a specific value of the heartbeat period is not specifically limited in this embodiment of this application.

For example, the wakeup parameter may include parameters such as a wakeup random code and a wakeup random number. The wakeup random number is a verification random number used when the terminal is woken up from the standby mode, and performing verification on the wakeup random number by the terminal can improve security of a wakeup process.

Step 3: The terminal sends second notification information to the relay device by using the first communication link, where the second notification information is used to notify the relay device that the terminal is to disable the RF module of the Wi-Fi module used for high-speed transmission, and the relay device enables a device online non-timeout function, in other words, the relay device does not limit online duration of the terminal, and keeps a connection to the terminal for network communication. The online non-timeout function may mean that the relay device sets a related parameter, so that even if service communication has not been performed within a preset time limit, the relay device does not determine that the terminal is in an offline state.

Step 4: The terminal disables the RF module of the Wi-Fi module used for high-speed transmission.

It should be understood that, when the terminal is in the normal service mode, the Wi-Fi module used for high-speed transmission completes a network communication function including data and information transmission. The Wi-Fi module includes an MCU, an RF transmitter, an RF receiver, and the like. When the terminal enters the standby mode, to reduce as much power consumption of the terminal as possible, the RF module used for high-speed data transmission is disabled, data transceiving is stopped, and only a small amount of power is retained to maintain memory refresh of the Wi-Fi module. In this case, the Wi-Fi module of the terminal is in an ultra-low power consumption mode. In an optional case, a working current of the Wi-Fi module in the ultra-low power consumption mode is only approximately 10 microamperes to 20 microamperes. It should be understood that the ultra-low power consumption mode is different from a power-off mode. Because a memory of the Wi-Fi module is always refreshed, the Wi-Fi module of the terminal can quickly restore the normal service mode when there is a service requirement.

Step 5: The terminal powers off the main control CPU, and the terminal enters the standby mode.

Step 6: The terminal receives and acknowledges, through a second communication link, the terminal keep-alive packet sent by the relay device.

For example, after the terminal enters the standby mode, the RF module used for low-speed communication receives, through the second communication link, the terminal keep-alive packet sent by the relay device, and sends an acknowledgement packet to the relay device. Optionally, the acknowledgement packet sent by the terminal to the relay device may be an acknowledgement (ACK) packet. The ACK packet is simple in form, and usually occupies only 4 or 8 bytes, but a normal keep-alive packet (for example, the cloud keep-alive packet and the terminal keep-alive packet sent by the relay device) needs to occupy dozens of bytes. It should be understood that, to further reduce power consumption of the terminal in the standby mode, the relay device sends a keep-alive packet to the terminal, and the terminal only needs to send an acknowledgement packet in a simpler form. In other words, the relay device queries, by using the keep-alive packet, whether the terminal is online. The terminal only needs to answer yes. Therefore, acknowledgement information is simpler and power consumption is lower. When the relay device cannot receive an acknowledgement from the terminal, the relay device considers that the terminal is in an offline state. In this case, the relay device stops sending the cloud keep-alive packet to the cloud server, and the terminal is disconnected from the cloud server. When the relay device receives an acknowledgement from the terminal, the relay device considers that the terminal is in an online state, and sends the cloud keep-alive packet to the cloud server, so that a connection between the terminal and the cloud server is kept.

Optionally, the relay device periodically sends the terminal keep-alive packet to the terminal. For example, a sending period may be obtained through negotiation in step 2. In an optional case, to minimize a time required for waking up the terminal and to enable the terminal to be restored to the normal service mode as soon as possible when there is a service requirement, the low-speed RF module of the terminal starts once every 0.5 seconds to 1 second, to receive and acknowledge a wakeup packet or a keep-alive packet.

In an optional case, when the terminal is in the standby mode, a working current of the low-speed RF module is 30 microamperes to 40 microamperes, which is significantly lower than a working current of approximately 300 microamperes to 400 microamperes when the terminal performs a heartbeat keep-alive operation by using the high-speed Wi-Fi module.

Step 7: The cloud server sends a first wakeup packet to the relay device.

When the terminal needs to be woken up, the cloud constructs the first wakeup packet and sends the first wakeup packet to the relay device. The first wakeup packet carries a device ID of the terminal to be woken up. In addition, the first wakeup packet may further carry a wakeup period, and the wakeup period may be determined by the cloud, and is used to instruct the relay device to send a wakeup packet to the terminal based on the wakeup period. A specific value of the wakeup period is not limited herein. Optionally, the wakeup packet is periodically sent to a proxy module of the relay device based on the wakeup period by using the router.

Step 8: The relay device constructs a second wakeup packet based on the received first wakeup packet.

After receiving the wakeup packet sent by the cloud, the relay device parses the wakeup packet to obtain the device ID of the terminal that needs to be woken up, and the relay device obtains a network communication related parameter of the terminal based on the device ID. In an optional case, the relay device obtains the network communication related parameter of the terminal from HOSTAPD of the Wi-Fi module, namely, the high-speed communications module. The relay device constructs the second wakeup packet based on a parsing result. The second wakeup packet may include the device ID, the network communication related parameter obtained through parsing, a wakeup feature code and a wakeup random number that are previously obtained through negotiation, and the like. For example, the network communication related parameter may include a channel parameter of the first communication link, an address parameter of the terminal, and the like. The parameter may be used by the terminal to quickly establish a communication connection to the relay device by using the first communication link, to restore the normal service mode. The wakeup feature code is a preset identifier used to identify a wakeup packet. For example, the cloud may instruct, by sending 010101 to the relay device, the relay device to wake up the terminal, where 010101 is the wakeup feature code.

Step 9: The relay device sends the second wakeup packet to the terminal through the second communication link.

The relay device sends, through the second communication link, the second wakeup packet to a wakeup module of the terminal corresponding to the device ID.

Step 10: After receiving the second wakeup packet, the terminal verifies whether the wakeup random number carried in the second wakeup packet is consistent with a wakeup random number that is preset or obtained through negotiation, and if they are consistent, the main control CPU of the terminal is powered on, or if they are inconsistent, the terminal is still in the standby mode. The terminal powers on a part that is of the high-speed Wi-Fi module and that is powered off, enables the RF module, and enters the normal service mode. Optionally, the terminal quickly establishes a communication connection to the relay device based on the channel parameter and the address parameter in the second wakeup packet, and resumes service communication through the first communication link.

Step 11: The terminal sends third notification information to the relay device through the first communication link, where the third notification information is used to instruct the relay device to stop serving as a proxy for the terminal to send the keep-alive packet to the cloud, so that the terminal enters a business service mode, for example, may perform services such as a login service, a push service, and an on-demand service.

Figure 6:
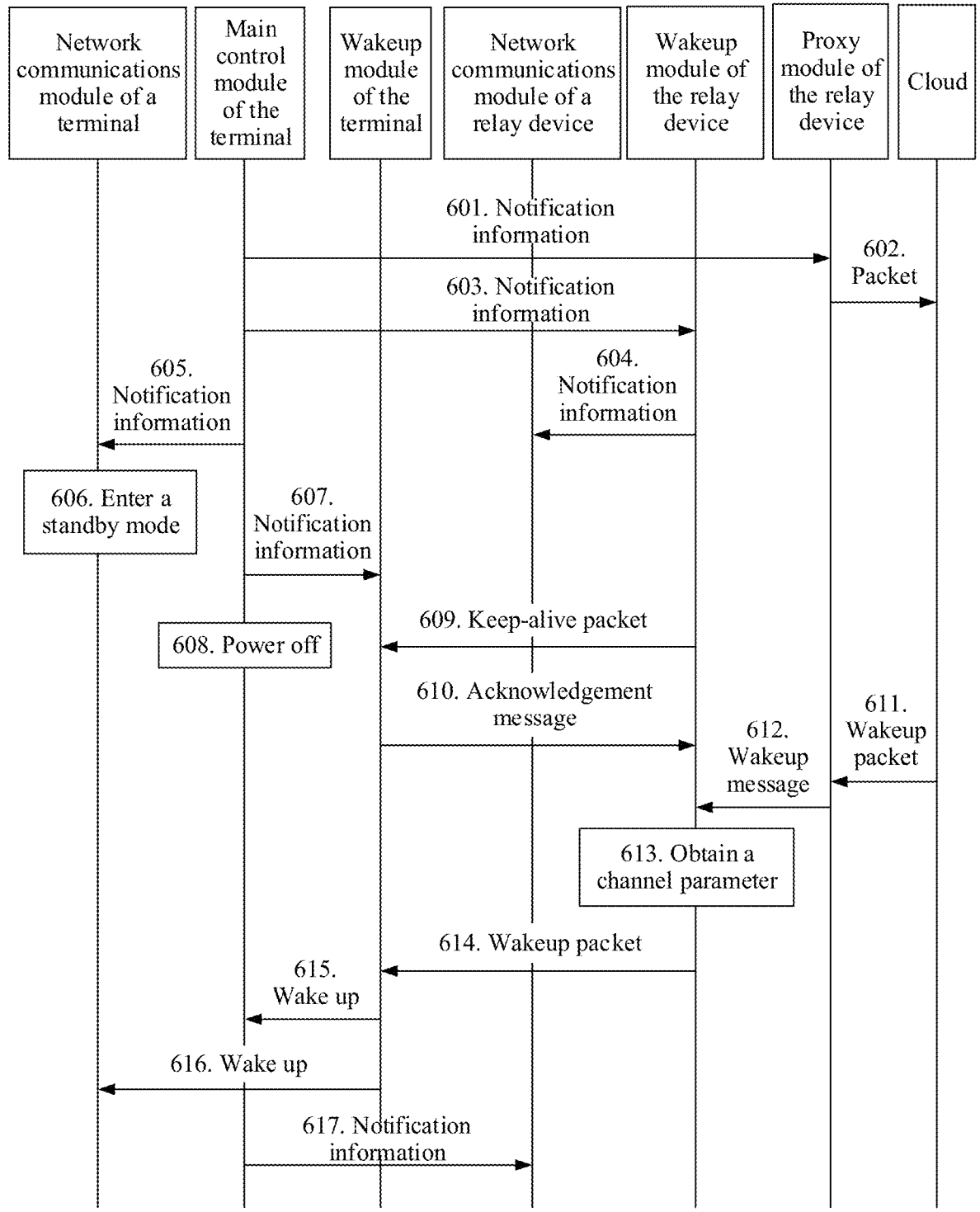
FIG. 6 is another interaction flowchart of a standby control method according to an embodiment of this application.

In the embodiment corresponding to FIG. 5, the steps performed by the terminal and the relay device in the standby control method from a perspective of a standby control system are described. The following describes a standby control method from a perspective of modules of a terminal and a relay device. Based on the diagram of the terminal networking architecture shown in FIG. 2, FIG. 6 is another interaction flowchart of a standby control method according to an embodiment of this application.

It should be noted that, in this embodiment, a proxy module of a relay device may be integrated into a first communications module of the relay device or integrated into another module. A specific implementation form of the proxy module of the relay device is not limited herein.

601. A main control module of a terminal sends notification information to the proxy module of the relay device.

In a business service mode, the terminal may be communicatively connected to the cloud by using the relay device and a router. The terminal transmits data through a first communication link between a network communications module of the terminal and a network communications module of the relay device. For example, the first communication link is a high-speed transmission link, and a transmission rate is greater than 10 megabytes per second.

After the terminal receives a standby instruction, the main control module of the terminal sends the notification information to the proxy module of the relay device through the first communication link, to instruct the proxy module of the relay device to enable a cloud standby keep-alive proxy. The cloud standby keep-alive proxy is used to keep the terminal connected to the cloud.

602. The proxy module of the relay device sends a packet to the cloud.

After receiving the notification information sent by the main control module of the relay device, the proxy module of the relay device enables the cloud standby keep-alive proxy.

It should be noted that the proxy module of the relay device is located in the relay device. That the proxy module of the relay device sends the packet to the cloud is actually that the proxy module of the relay device sends the packet to the cloud by using the network communications module of the relay device. Optionally, the packet sent by the proxy module of the relay device is sent to the cloud by using the router.

In this embodiment, the cloud standby keep-alive proxy may include the following several aspects:

1. The proxy module of the relay device periodically sends a keep-alive packet to the cloud by using the router, to keep a connection between the terminal and the cloud.

2. The proxy module of the relay device periodically sends a DHCP lease renewal packet and a gratuitous ARP packet to the router, to keep a connection between the terminal and the router, where the DHCP lease renewal packet may be used to renew an IP address lease, and the gratuitous ARP packet is used to prevent an ARP table of the router from aging.

A period of sending the keep-alive packet by the proxy module of the relay device may be negotiated between the relay device and the cloud by using a keep-alive packet. A period of sending the DHCP lease renewal packet and the gratuitous ARP packet may be negotiated between the proxy module of the relay device and the router, or the DHCP lease renewal packet and the gratuitous ARP packet may be sent based on a preset period. The periods of sending the keep-alive packet, the DHCP lease renewal packet, and the gratuitous ARP packet by the proxy module of the relay device is not specifically limited herein. For example, the period of sending the packet to the cloud by the proxy module of the relay device may be 30 seconds to 60 seconds. It should be understood that a time interval is set to periodically send the keep-alive packet to reduce power consumption, and setting a proper time interval can properly reduce system power consumption while keeping a connection between the relay device and the cloud.

603. The main control module of the terminal sends notification information to a wakeup module of the relay device.

The main control module of the terminal sends the standby notification information to the wakeup module of the relay device through the first communication link. The wakeup module of the relay device establishes a second communication link with a wakeup module of the terminal based on the standby notification information. The main control module of the terminal may add a heartbeat period and a wakeup random number to the standby notification information, or the main control module of the terminal and the wakeup module of the relay device negotiate about parameters such as a heartbeat period and a wakeup random number by using a packet.

The heartbeat period is a period of sending a heartbeat packet between the wakeup module of the terminal and the wakeup module of the relay device when the terminal is in a standby mode. In an optional case, the period of sending the heartbeat packet between the wakeup module of the terminal and the wakeup module of the relay device may be 5 seconds to 10 seconds. However, a specific value of the heartbeat period is not specifically limited in this embodiment of this application.

The wakeup random number is a verification random number used when the terminal is woken up from the standby mode, and performing verification on the wakeup random number by the terminal can improve security of a wakeup process.

It should be noted that an execution sequence of step 601 and step 603 is not limited, and step 601 may be performed before step 603, or step 603 may be performed before step 601.

604. The wakeup module of the relay device sends notification information to the network communications module of the relay device.

The notification information is used to notify the network communications module of the relay device that the terminal is to enter the standby mode. After receiving the notification information sent by the wakeup module of the relay device, the network communications module of the relay device enables a device online non-timeout function. The online non-timeout function means that the network communications module of the relay device sets a related parameter to keep the network communications module of the terminal in an online state. Even if service communication has not been performed within a preset time limit, the relay device does not determine that the terminal is offline.

605. The main control module of the terminal sends a message to the network communications module of the terminal.

The main control module of the terminal sends the notification information to the network communications module of the terminal to instruct the network communications module of the terminal to enter the standby mode.

606. The network communications module of the terminal enters the standby mode.

After receiving the notification information sent by the main control module of the terminal, the network communications module of the terminal enters the standby mode.

It should be understood that power is not supplied to most function modules of the network communications module in the standby mode, and only a small amount of power is retained to maintain memory refresh. For example, the network communications module of the terminal in the standby mode disables a radio frequency module and does not transmit or receive a radio frequency signal any more, and a CPU of the network communications module of the terminal is powered off and does not process a communication service any more. Power consumption of the network communications module of the terminal in the standby mode is very low. In an optional case, a working current of the network communications module of the terminal in this mode is only approximately 10 microamperes (uA) to 20 microamperes (uA).

However, the network communications module of the terminal in the standby mode is not totally powered off, and some modules are still consuming power to only maintain memory refresh, so that a normal service mode can be quickly restored when there is a communication requirement.

607. The main control module of the terminal sends notification information to the wakeup module of the terminal.

The main control module of the terminal sends the notification information to the wakeup module of the terminal to notify the wakeup module of the terminal that the terminal is to enter the standby mode. The wakeup module of the terminal sets a related parameter, so that the wakeup module can receive and acknowledge a keep-alive packet sent by the wakeup module of the relay device.

608. The main control module of the terminal is powered off.

The main control module of the terminal is powered off, and the terminal enters the standby mode.

609. The wakeup module of the relay device sends a keep-alive packet to the wakeup module of the terminal.

The wakeup module of the relay device sends, through the second communication link, the keep-alive packet to the wakeup module of the terminal based on a heartbeat period obtained through negotiation, and the period of sending the keep-alive packet by the wakeup module of the relay device is not specifically limited. For example, the sending period may be 0.5 seconds to 1 second, to ensure that the terminal can be woken up in a timely manner when receiving a communication requirement of the cloud.

It should be noted that an execution sequence of step 609 and step 604 is not specifically limited. Step 604 may be performed before step 609, step 609 may be performed before step 604, or step 604 and step 609 may be concurrently performed.

610. The wakeup module of the terminal sends acknowledgement information to the wakeup module of the relay device.

After the wakeup module of the terminal receives the keep-alive packet periodically sent by the wakeup module of the relay device, the wakeup module of the terminal sends the acknowledgement information to the wakeup module of the relay device through the second communication link. After receiving the acknowledgement information sent by the wakeup module of the terminal, the wakeup module of the relay device may confirm that the terminal is still connected to the relay device. When the terminal is in the standby mode, the terminal performs a heartbeat keep-alive operation with the wakeup module of the relay device by using the wakeup module of the terminal. In an optional case, a working current of the wakeup module of the terminal is 30 microamperes to 40 microamperes, which is significantly lower than a working current of approximately 300 microamperes to 400 microamperes when the terminal performs a heartbeat keep-alive operation by using the network communications module.

611. The cloud sends a wakeup packet to the proxy module of the relay device.

When the terminal needs to be woken up, the cloud constructs the wakeup packet and sends the wakeup packet to the proxy module of the relay device. The wakeup packet carries a device ID of the terminal to be woken up. In addition, the wakeup packet may further carry a wakeup period, and the wakeup period may be determined by the cloud, and is used to instruct the relay device to send a wakeup packet to the terminal based on the wakeup period. A specific value of the wakeup period is not limited herein. The wakeup packet is periodically sent to the proxy module of the relay device based on the wakeup period by using the router.

612. The proxy module of the relay device sends a wakeup message to the wakeup module of the relay device.

After receiving the wakeup packet sent by the cloud, the proxy module of the relay device parses the wakeup packet to obtain the device ID of the terminal that needs to be woken up, and then sends, to the wakeup module of the relay device, the wakeup message that carries the device ID.

613. The wakeup module of the relay device obtains a channel parameter of the network communications module of the relay device.

The wakeup module of the relay device receives the wakeup message that is sent by the network communications module of the relay device and that carries the device ID. The wakeup module of the relay device obtains, from the network communications module of the relay device based on the device ID, a parameter such as a channel or an address of the network communications module of the relay device. The parameter is a related parameter that may be used by the network communications module of the terminal to establish a communication connection to the network communications module of the relay device.

614. The wakeup module of the relay device sends a wakeup packet to the wakeup module of the terminal.

The wakeup module of the relay device constructs the wakeup packet, and sends, through the second communication link, the wakeup packet to the wakeup module of the terminal corresponding to the device ID. The wakeup packet may carry the channel parameter of the network communications module of the relay device. Optionally, the channel parameter may include information such as a channel or an address. Optionally, the wakeup packet may further carry a wakeup feature code and a wakeup random number. The wakeup feature code is a preset identifier used to identify the wakeup packet. The wakeup module of the terminal verifies whether the wakeup random number is consistent with a wakeup random number that is preset by the main control module of the terminal or determined through negotiation. If they are consistent, the wakeup module of the terminal wakes up the terminal, or if they are inconsistent, the wakeup module of the terminal does not wake up the terminal.

615. The wakeup module of the terminal wakes up the main control module.

The wakeup module of the terminal receives the wakeup packet, and wakes up the main control module of the terminal based on the wakeup packet, and the main control module of the terminal is powered on.

616. The wakeup module of the terminal wakes up the network communications module of the terminal.

After receiving the wakeup packet, the wakeup module of the terminal may wake up the network communications module of the terminal based on the wakeup packet. A part that is of the network communications module and that is powered off is powered on again, and the radio frequency module is enabled to enter the normal service mode. Optionally, the wakeup module of the terminal sends notification information to the network communications module of the terminal. The notification information may carry the channel parameter of the network communications module of the relay device. The network communications module may quickly resume service communication through the first communication link based on the channel parameter.

617. The main control module of the terminal sends notification information to the network communications module of the relay device.

The main control module of the terminal sends the notification information to the network communications module of the relay device through the first communication link, to instruct the network communications module of the relay device to terminate a terminal keep-alive proxy, and the terminal enters a business service mode, and may perform services such as a login service, a push service, and an on-demand service.

According to the standby control method provided in this embodiment of this application, a second communications module of the terminal and the relay device are added. In the standby mode, a first communications module of the terminal enters an ultra-low power consumption standby mode, and the terminal keeps a heartbeat connection to the relay device by using the second communications module of the terminal. Because power consumption of the second communications module of the terminal is lower than that of the first communications module of the terminal, power consumption of the terminal in the standby mode is reduced.

Figure 7:
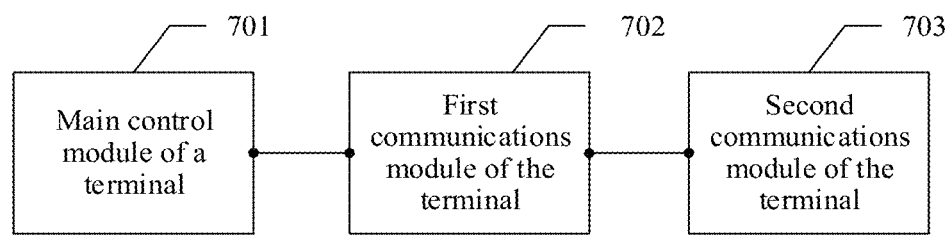
FIG. 7 is a schematic diagram of an embodiment of a terminal according to the embodiments of this application.

The standby control method is described in the foregoing embodiment. The following describes a terminal that implements the standby control method. FIG. 7 is a schematic diagram of a standby control terminal according to an embodiment of this application.

The terminal includes a main control module 701 of the terminal, a first communications module 702 of the terminal, and a second communications module 703 of the terminal.

The main control module 701 of the terminal is configured to control the terminal to enter a standby mode. For details, refer to descriptions of step 601, step 603, step 605 to step 608, and step 617 in the method embodiment. Details are not described herein again.

The first communications module 702 of the terminal is configured to transmit data in a service communication mode. When the terminal enters the standby mode, the first communications module 702 of the terminal stops working. For details, refer to descriptions of step 606 and step 616 in the method embodiment. Details are not described herein again.

The second communications module 703 of the terminal is configured to perform a heartbeat keep-alive function when the terminal is in the standby mode and wake up the terminal from the standby mode. For details, refer to descriptions of step 607, step 610, step 615, and step 616 in the method embodiment. Details are not described herein again. In this embodiment of this application, when being in the standby mode, the terminal performs a heartbeat keep-alive operation with a relay device by using the second communications module 703 of the terminal, the first communications module of the terminal disables a radio frequency module, and the main control module 701 of the terminal is powered off. Because power consumption of the second communications module 703 of the terminal in the standby mode is lower than that of the first communications module of the terminal, power consumption of the terminal in the standby mode is reduced.

Figure 8:
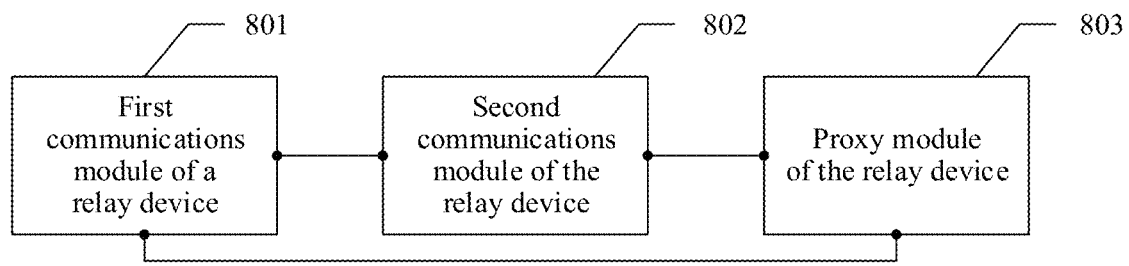
FIG. 8 is a schematic diagram of an embodiment of a relay device according to the embodiments of this application.

The foregoing describes the terminal that implements the standby control method. The following describes a relay device that implements the standby control method. FIG. 8 is a schematic diagram of an embodiment of a relay device according to the embodiments of this application.

The relay device includes a first communications module 801 of the relay device, a second communications module 802 of the relay device, and a proxy module 803 of the relay device.

The first communications module 801 of the relay device is configured to: when a terminal is in a business service mode, provide a connection for the terminal and the cloud for data transmission. For details, refer to descriptions of step 604, step 605 to step 608, and step 617 in the method embodiment. Details are not described herein again.

The second communications module 802 of the relay device is configured to perform a heartbeat keep-alive function in cooperation with a second communications module of the terminal when the terminal is in a standby mode and wake up the terminal from the standby mode. For details, refer to descriptions of step 603, step 604, step 609, step 610, and step 612 to step 614 in the method embodiment. Details are not described herein again.

The proxy module 803 of the relay device is configured to: after the terminal enters the standby mode, serve as a proxy for the terminal to keep a connection to the cloud and receive a cloud wakeup message. For details, refer to descriptions of step 601, step 602, step 611, and step 612 in the method embodiment. Details are not described herein again.

It should be noted that, in this embodiment, the proxy module 803 of the relay device may be integrated into the first communications module 801 of the relay device for implementation, and details are not described herein.

In this embodiment of this application, when the terminal enters the standby mode, the relay device may keep a heartbeat connection to the terminal by using the second communications module 802 of the relay device, or may enable a cloud standby keep-alive proxy by using the proxy module 803 of the relay device, so that the terminal still keeps a connection to the relay device, a router, and the cloud when the terminal is in the standby mode, and can quickly resume service communication when being woken up. Communication with a second communications module of the terminal by using the second communications module 802 of the relay device can further reduce power consumption of a standby module of the terminal.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

An embodiment of this application further provides a computer-readable storage medium. The computer-readable storage medium stores an instruction; and when the instruction runs on a computer, the computer performs one or more steps in any one of the foregoing methods. When each component module of the terminal or the relay device is implemented in a form of a software functional unit and sold or used as an independent product, the component modules may be stored in the computer-readable storage medium.

Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A standby control method, comprising:
after a standby instruction is received, sending, by a terminal, first notification information to a relay device through a first communication link, wherein the first notification information is used to instruct the relay device to serve as a proxy for the terminal to send a first keep-alive packet to a cloud server to inform the cloud server that the terminal is online;

disabling, by the terminal, the first communication link and a main control central processing unit (CPU);

receiving, by the terminal, a second keep-alive packet sent by the relay device through a second communication link, wherein a communication rate of the second communication link is lower than a communication rate of the first communication link; and returning, by the terminal, acknowledgement information of the second keep-alive packet, through the second communication link, to inform the relay device that the terminal is online.

2. The standby control method according to claim 1, wherein after the disabling the main control CPU, the method further comprises:

receiving a wakeup packet sent by the relay device through the second communication link;

instructing, based on the wakeup packet, the main control CPU to be powered on; and enabling the first communication link based on the wakeup packet.

3. The method according to claim 1, wherein the disabling the first communication link comprises disabling an RF module used for high-speed data transmission.

4. The method according to claim 2, wherein the wakeup packet comprises a channel parameter of the first communication link; and the first communication link is enabled based on the channel parameter to perform service communication with the relay device through the first communication link.

5. The method according to claim 1, wherein a communication resource occupied by the acknowledgement information of the second keep-alive packet is smaller than a communication resource occupied by the second keep-alive packet.

6. A standby control method, comprising:

receiving, by a relay device, first notification information sent by a terminal through a first communication link;

under an instruction of the first notification information, serving, by the relay device, as a proxy for the terminal to send a first keep-alive packet to a cloud server to inform the cloud server that the terminal is online;

sending, by the relay device, a second keep-alive packet to the terminal through a second communication link;

receiving, by the relay device and through the second communication link, acknowledgement information that is of the second keep-alive packet and that is returned by the terminal, wherein a communication rate of the second communication link is lower than a communication rate of the first communication link; and confirming, by the relay device and based on the acknowledgement information, that the terminal is online.

7. The method according to claim 6, wherein the method further comprises:

sending a wakeup packet to the terminal through the second communication link, wherein the wakeup packet is used for the terminal enabling a main control central processing unit (CPU) and the first communication link based on the wakeup packet.

8. The method according to claim 7, wherein the enabling the first communication link comprises enabling an RF module used for high-speed data transmission.

9. The method according to claim 6, wherein before the sending the second keep-alive packet to the terminal through the second communication link, the method further comprises:

receiving second notification information sent by the terminal through the first communication link; and setting, based on the second notification information, the terminal to be in a connected state on the first communication link.

10. The method according to claim 6, wherein a communication resource occupied by the acknowledgement information of the second keep-alive packet is smaller than a communication resource occupied by the second keep-alive packet.

11. A terminal, comprising a main processor and a subordinate processor, wherein the main processor is configured to read a software instruction in a memory, and execute the software instruction to implement the following operations:

after a standby instruction is received, send first notification information to a relay device through a first communication link, wherein the first notification information is used to instruct the relay device to serve as a proxy for the terminal to send a first keep-alive packet to a cloud server to inform the cloud server that the terminal is online; and disable the first communication link and a main control central processing unit (CPU); and the subordinate processor is configured to read a software instruction in a memory, and execute the software instruction to implement the following operations:

receive a second keep-alive packet sent by the relay device through a second communication link, wherein a communication rate of the second communication link is lower than a communication rate of the first communication link; and return acknowledgement information of the second keep-alive packet to inform the relay device that the terminal is online.

12. The terminal according to claim 11, wherein the subordinate processor is further configured to:

receive a wakeup packet sent by the relay device through the second communication link;

instruct, based on the wakeup packet, the main processor to enable the main control CPU; and instruct, based on the wakeup packet, the main processor to enable the first communication link.

13. The terminal according to claim 11, wherein the main processor is further configured to:

disable an RF module used for high-speed data transmission.

14. The terminal according to claim 12, wherein the wakeup packet comprises a channel parameter of the first communication link; and the main processor is further configured to enable the first communication link based on the channel parameter to perform service communication with the relay device through the first communication link.

15. The terminal according to claim 12, wherein:

the main processor is further configured to negotiate with the relay device about a heartbeat period by using the first communication link; and the subordinate processor is further configured to receive the second keep-alive packet sent by the relay device through the second communication link based on the heartbeat period.

16. A relay device, comprising a main processor and a subordinate processor, wherein
the main processor is configured to read a software instruction in a memory, and execute the software instruction to implement the following operations:
receive first notification information sent by a terminal through a first communication link; and
under an instruction of the first notification information, serve as a proxy for the terminal to send a first keep-alive packet to a cloud server to inform the cloud server that the terminal is online; and
the subordinate processor is configured to read a software instruction in a memory, and execute the software instruction to implement the following operations:
send a second keep-alive packet to the terminal through a second communication link; and
receive, through the second communication link, acknowledgement information that is of the second keep-alive packet and that is returned by the terminal, wherein a communication rate of the second communication link is lower than a communication rate of the first communication link; and
confirm, based on the acknowledgement information, that the terminal is online.

17. The relay device according to claim 16, wherein the subordinate processor is further configured to:
send a wakeup packet to the terminal through the second communication link, wherein the wakeup packet is used for the terminal enabling a main control CPU and the first communication link based on the wakeup packet.

18. The relay device according to claim 17, wherein enabling the first communication link comprises enabling an RF module used for high-speed data transmission.

19. The relay device according to claim 18, wherein the main processor is further configured to:
receive second notification information sent by the terminal through the first communication link, to learn that the terminal is to disable the RF module; and
set, based on the second notification information, the terminal to be in an online state on the first communication link.

20. The relay device according to claim 16, wherein the main processor is further configured to:
stop sending the first keep-alive packet to the cloud server to disconnect the terminal from the cloud server, when the subordinate processor has not received, within a preset time limit, the acknowledgement information that is of the second keep-alive packet and that is returned by the terminal.

* * * * *